(12) United States Patent
Chow et al.

(10) Patent No.: US 7,187,712 B2
(45) Date of Patent: Mar. 6, 2007

(54) EFFICIENT FRAMING OF OVERHEAD CHANNEL FOR ADSL MODEMS

(75) Inventors: Francis M. Chow, San Jose, CA (US); Konrad W. Kratochwil, Menlo Park, CA (US); Benjamin A. Wiseman, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 736 days.

(21) Appl. No.: 10/105,148

(22) Filed: Mar. 25, 2002

(65) Prior Publication Data

US 2002/0196813 A1 Dec. 26, 2002

Related U.S. Application Data

(60) Provisional application No. 60/339,756, filed on Dec. 17, 2001, provisional application No. 60/327,780, filed on Oct. 10, 2001, provisional application No. 60/280,862, filed on Apr. 2, 2001.

(51) Int. Cl.
*H04B 1/38* (2006.01)
*H04J 3/12* (2006.01)

(52) U.S. Cl. ................................ 375/222; 370/528
(58) Field of Classification Search ............... 375/222, 375/371; 370/523, 528, 505; 714/776, 758
See application file for complete search history.

(56) References Cited

U.S. PATENT DOCUMENTS

| 5,144,625 | A  | * | 9/1992  | Cain et al. ............... | 370/522 |
| 5,452,306 | A  | * | 9/1995  | Turudic et al. ........... | 370/465 |
| 6,449,288 | B1 | * | 9/2002  | Chari et al. .............. | 370/470 |
| 6,522,666 | B1 | * | 2/2003  | Tzannes et al. ........... | 370/471 |
| 6,778,596 | B1 | * | 8/2004  | Tzannes ................... | 375/222 |
| 6,788,678 | B1 | * | 9/2004  | Rice et al. .............. | 370/359 |
| 6,801,570 | B2 | * | 10/2004 | Yong ...................... | 375/219 |
| 6,865,190 | B2 | * | 3/2005  | Abbas et al. ............. | 370/471 |
| 6,922,444 | B1 | * | 7/2005  | Cai et al. ............... | 375/260 |
| 2002/0075902 | A1 | * | 6/2002 | Abbas et al. ............. | 370/474 |
| 2002/0080867 | A1 | * | 6/2002 | Abbas et al. ............. | 375/222 |

* cited by examiner

*Primary Examiner*—Tesfaldet Bocure
*Assistant Examiner*—Vineeta Panwalkar
(74) *Attorney, Agent, or Firm*—Steven A. Shaw; W. James Brady; Frederick J. Telecky, Jr.

(57) ABSTRACT

An efficient framing scheme is described for the transmission of frame overhead data in next generation ADSL modems. As a result of this new framing scheme, the available data rate for the transmission of payload data increases. High payload data rates and consequently wider reach of the ADSL modem are the most important performance requirements and customer care-abouts for ADSL modems. This application explains the new framing scheme in detail and provides examples for the computation of the framing parameters.

18 Claims, 3 Drawing Sheets

EFFICIENT FRAMING OF OVERHEAD CHANNEL FOR ADSL MODEMS

This application claims priority under 35 USC § 119(e)(1) of provisional applications Ser. No. 60/280,862 filed Apr. 2, 2001, Ser. No. 60/327,780 filed Oct. 10, 2001, and Ser. No. 60/339,756 filed Dec. 17, 2001.

FIELD OF INVENTION

This invention relates to ADSL modems and more particularly to more efficient framing of the overhead channel.

BACKGROUND OF INVENTION

Digital Subscriber Line (DSL) technologies are a family of high-speed access technologies using ordinary telephone lines. One of these DSL technologies is Asymmetric Digital Subscriber Line (ADSL). ADSL is characterized by a different data rate from the service provider to the customer premises (downstream) as compared to the data rate from the customer premises to the service provider (upstream). Data rates are typically 10 times higher in the downstream direction (compared to the data rate in the upstream direction), which are suitable for applications such as in Internet access. However, other ratios of downstream to upstream rates are also used. For example, voice delivery over ADSL uses symmetric data rates (i.e. same data rate in downstream and upstream direction) while video delivery over ADSL is highly asymmetric and uses as much as 100 times higher downstream than upstream rates. ADSL shares the same line as the telephone but uses a higher frequency band than the voice band. A POTS (Plain Old Telephone System) splitter on the customer premises equipment is used to separate the voice and ADSL signals. ADSL is geared to the consumer market. The standard ADSL technology uses Discrete Multitone (DMT) modulation. The transceiver may carry more than one data channel and may also carry an embedded operations channel (EOC), an ADSL overhead channel (AOC), and also various other bits. The physical ADSL link carries more than one logical channel, where a logical channel is defined as a data or an overhead channel. The logical data channels or bearer channels on the ADSL link consist of four possible simplex downstream channels and three possible full-duplex channels. The simplex channel is commonly used as the downstream channel. The duplex channels may have different upstream and downstream rates and may be used in the simplex mode for upstream transmissions. ADSL has a superframe structure made up of N data frames with the $(N+1)^{th}$ frame being a synchronization symbol or sync frame. For ITU-T G.992.1, ITU-T G.992.2, and TIA/ANSI T1.413 standards we have N=68. Each data frame contains a specified number of bytes for each of the logical data channels. The interleaved path contains an interleaving function in the transmitter and the fast path does not. Overhead bytes are also contained in each data frame. The overhead bytes contained are different for different frame numbers. Each data frame is divided into a fast buffer part for data to be sent via the fast path and an interleaved buffer part to be sent via the interleaved path. The overhead bytes consist of messages in the EOC and AOC channels as well as bit level indicators. In a dual-latency configuration, the EOC is carried in the fast byte of the fast channel. The ATU-C (modem located at the central office) uses the EOC messages to retrieve information from and to send information to the remote ATU-R (remote). The AOC channel allows for a process known as bit swapping in which a bit is removed from one carrier (causing a constellation to become smaller) and is placed onto another carrier (causing its constellation to become larger). AOC messages can be carried in either the sync byte of the interleaved channel or the LEX byte of the interleaved channel in a dual-latency configuration. LEX byte is inserted in a transmitted ADSL frame structure to provide synchronization capacity that is shared among various channels. In a single-latency configuration, both the EOC and AOC are carried in the same (fast or interleave) channel. For each superframe, 24 indicator bits are sent using an overhead byte in frame 1, frame 34 and frame 35. These bits indicate the per ATU anomalies that have occurred during the preceding superframe. These anomalies include whether or not the Forward Error Correction (FEC) had to correct any bytes during the previous superframe, whether or not a loss of signal (LOS) occurred during the last superframe, and whether a remote default indication (rdi) is present.

A problem with current G.dmt standards and G.lite standards for ADSL modems is that a fixed and sometimes excessive data rate is allocated to the frame overhead channel. This not only results in reduced available payload data rates but also in reduced reach of ADSL modems. Both represent obstacles for wider deployment of ADSL technology. The ability to effectively reduce the data rate of the frame overhead channel makes a higher payload data rate available and increases the reach of ADSL modems. It is highly desirable to provide a way of reducing the overhead data rate and decoupling the overhead channel transmission from the payload data transmission.

Two different proposals for framing of the overhead channel have been presented. The first proposal uses one Sync Byte per MUX Data Frame (MDF) to carry the overhead channel. This proposal has the advantage of being very similar to the framing of the overhead channel in the G.992.1 standard, but it also has the following issues:

When no fast (i.e. non-interleaved) path is available (as is the case in interleaved, single-latency mode), the overhead channel is interleaved and end-to-end transmission delay cannot be guaranteed. The term "latency" refers to end-to-end delay of data transmission from the transmitter (for example, central office) to the receiver (the user, for example). The latency in the fast path is smaller than that of the interleave path. A DSL connection can be trained to have only one of the two latency paths, resulting in a single-latency mode. It can be trained to have both the fast and the interleave path, resulting in a dual-latency mode. Future standards may also support multiple latency paths beyond just two. The fact that this end-to-end transmission delay on the interleave path cannot be guaranteed may be unacceptable for the transmission of time sensitive Indicator Bits identified in a proposed standard (including Loss of Power indication). A solution is to open the fast path specifically to transmit the overhead channel in the Sync Bytes of the fast path. (This is already done in current ITU-T G.992.1).

Since the overhead channel is carried in the Sync Bytes and the Sync Bytes are tied to the MUX Data Frame(s), the frame overhead rate is tied to the net data rate in the same latency path through the relation:

$$\frac{\text{Net Data Rate}}{\sum_i B_{p,i}}$$

where i indexes the frame bearers (i.e. channels) and p denotes the latency path. As a result, it is not possible to keep the frame overhead rate (even approximately) constant while changing the net data rate (in the same latency path) through a new mode known as Seamless Rate Adaptation (SRA) that is proposed for next generation ADSL standards.

In multiple latency mode, the bit-oriented and the message-based overhead structure may be both carried in the overhead channel of one latency path while only the cyclic redundancy check (CRC) and some path-related Indicator Bits are carried in the respective overhead channels of all other latency paths. While the CRC covers 68 MUX Data Frames (containing 68 Sync Bytes), only two out of the 68 available Sync Bytes are actually used in those latency paths (i.e. one Sync Byte is used for the CRC, the other Sync Byte for the path-related Indicator Bits). In other words, 97% (i.e. 66/68) of the frame overhead rate remains unused on the additional latency path(s). Unused bandwidth on long loops at small available line rates is undesirable and this counters the objectives of next generation ADSL standards (G.dmt-.bis and G.lite.bis).

The second proposal moves the overhead channel into a separate latency path and thus achieves a separation of the frame overhead data rate from the next data rates in all latency paths. That is, changing any net data rate will not affect the frame overhead rate as long as $L_{OH}$ (i.e. the number of overhead bits per DMT symbols) is kept constant. This proposal has the following issues:

Since the bit-oriented and the message-based overhead structure are both carried in the separate overhead path, only the CRC and some path-related Indicator Bits are carried in the respective overhead channels of the latency paths. Now the same issue arises as described above, that is, 97% of the frame overhead rate remains unused per enabled latency path.

To achieve a lower frame overhead rate, the proposal suggests fractional values for M (i.e. the number of MUX Data Frames per Reed-Solomon codeword). However, since the CRC covers 68 MUX Data Frames, still only two out of 68 available Sync Bytes will be used for CRC and path-related Indicator Bits. As with integer M, 97% of the frame overhead rate remains unused.

SUMMARY OF INVENTION

In accordance with one embodiment of the present invention a method of framing an overhead channel in an ADSL system comprises the steps of: providing a data channel at a given rate and providing an overhead channel at a rate independent of the data channel rate.

In accordance with another embodiment of the present invention there is provided a method of decoupling the insertion of frame overhead bytes from MUX Data Frames by instead of inserting one frame overhead byte every MUX Data Frame, one (or more) frame overhead bytes is inserted every $T_p$ MUX Data Frames, where $T_p$ is a selectable parameter and index p indicates latency path.

DESCRIPTION OF PREFERRED EMBODIMENTS OF THE PRESENT INVENTION

A new method is introduced for framing the overhead channel in an ADSL system by defining a new parameter, $T_p$, where $T_p$ is a selectable parameter and the index p indicates the latency path. Instead of inserting one overhead byte into each MUX Data Frame, there are inserted one or more overhead bytes once every $T_p$ MUX Data Frames. This method decouples the overhead channel from the data channel and thus achieves that the frame overhead rate becomes independent of the payload data rate (also called: net data rate). Consequently, this method provides complete flexibility in choosing the minimum required frame overhead rate (for a given application), thus achieving the maximum possible net data rate on an ADSL loop.

Figure 1:
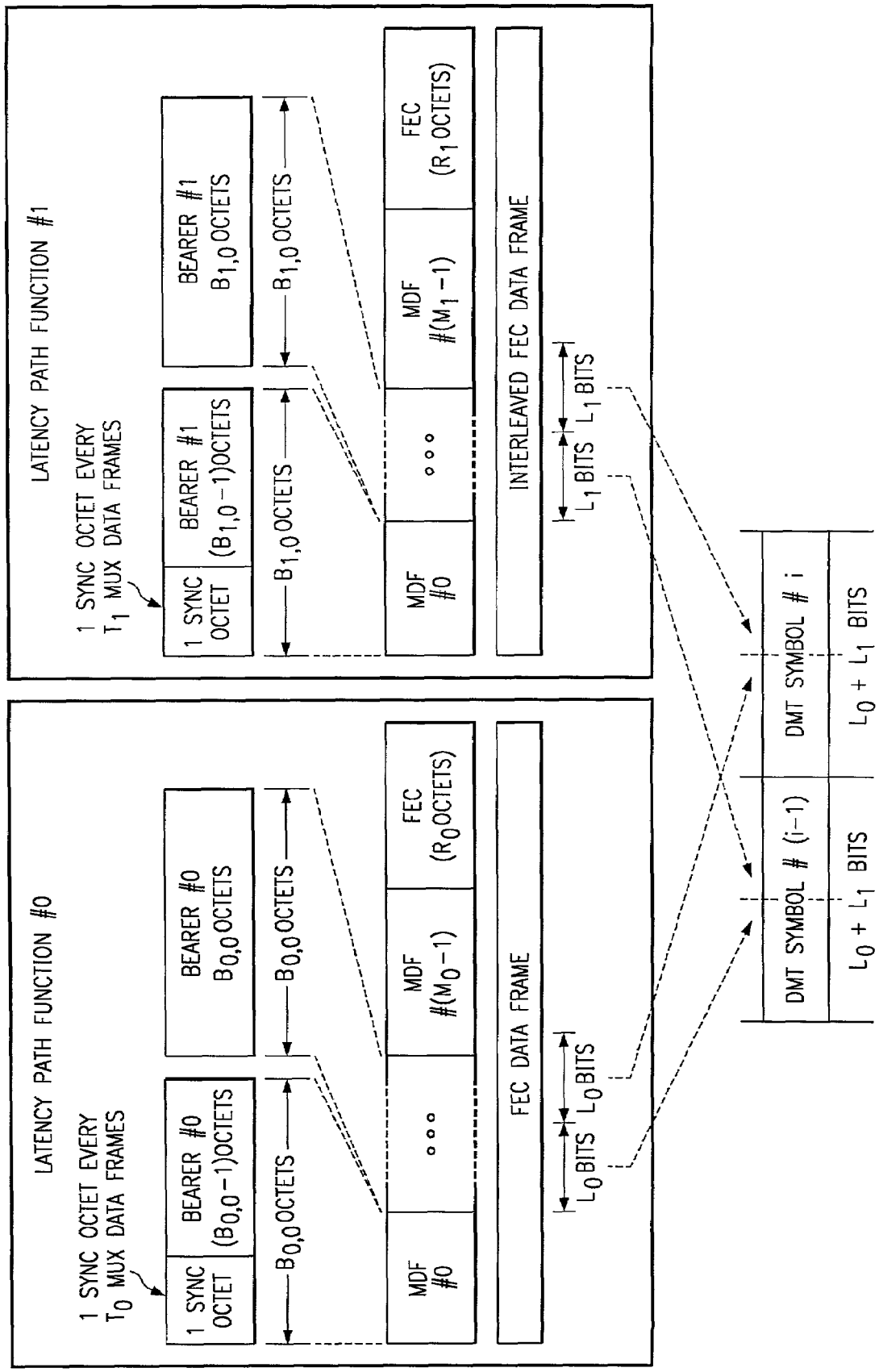
FIG. 1 illustrates the framing of the overhead channel for dual latency mode and two frame bearers according to one embodiment of the present invention.

FIG. 1 illustrates the overhead framing scheme and shows the insertion of overhead bytes into the stream of MUX Data Frames (MDF) for the case of two frame bearers transported over two latency paths (Latency Path Function #0 and Latency Path Function #1). Latency path function refers to the configuration of a latency path. In this example, one might choose $T_0=1$ for the latency path carrying the bit-oriented and the message-based overhead structure, and $T_1=34$ (i.e. 68/2) for the other latency path which only carries the CRC and path-related Indicator Bits in its overhead channel. FIG. 1 shows that $T_0$ and $T_1$, can be independently configured for two different latency paths. In this case path #0 is a path without interleaving and path #1 is a path with interleaving (see the frame as "Interleaved FEC data frame"). In each DMT symbol, data are grabbed from all latency paths according to $L_0+L_1$.

Figure 2:
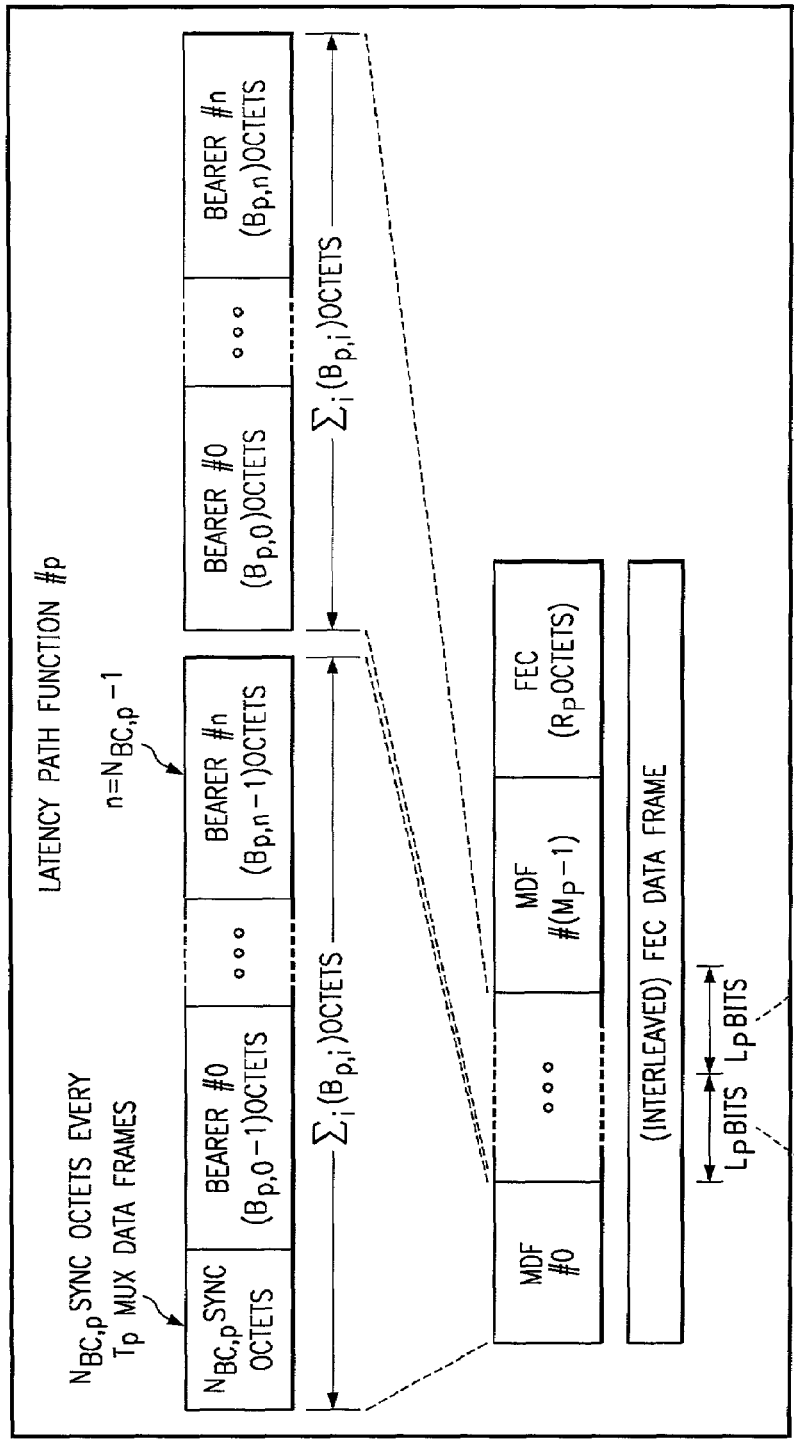
FIG. 2 illustrates the framing of the overhead channel on a generic latency path p with $N_{BC,p}$ frame bearers according to one embodiment of the present invention.

In the case of more than one frame bearer per latency path, one overhead byte is inserted per frame bearer (i.e. up to the number of frame bearers, $N_{BC,p}$, overhead bytes) once every $T_p$ MUX Data Frames. FIG. 2 shows the insertion of overhead bytes into the stream of MUX Data Frames for the general case of more than one frame bearer per latency path. FIG. 2 is showing a generic case of a DSL connection where there are n(n>p) latency paths, what is happening in a generic path p. Notice that the number of bytes in each MUX Data Frame $$\left(\text{i.e. } \sum_i B_{p,i}\right)$$

is kept constant by stealing one byte from each frame bearer once every $T_p$ MUX Data Frames. This scheme allows for a simple computation of the Net Data Rate on each frame bearer. In addition, a constant MUX Data Frame size simplifies the FEC codeword processing.

The Frame Overhead Rate and the Net Data Rate are then obtained by the following equations:

$$\text{Frame Overhead Rate} = \frac{N_{BC,p}}{T_p} \times \frac{M_p}{S_p} \times 32 \text{ kbps} = \frac{N_{BC,p}}{T_p} \times \frac{M_p \times L_p}{K_p \times M_p \times R_p} \times \text{kbps}$$

$$\text{Net Data Rate} = \frac{(K_p - N_{BC,p}/T_p) \times M_p}{S_p} \times 32 \text{ kbps} =$$

$$\frac{(K_p - N_{BC,p}/T_p) \times M_p \times L_p}{K_p \times M_p + R_p} \times 4 \text{ kbps}$$

The Aggregate Data Rate is defined as the sum of Net Data Rate and Frame Overhead Rate and is obtained as:

$$\text{Aggregate Data Rate} = \frac{K_p \times M_p \times L_p}{K_p \times M_p + R_p} \times 4 \text{ kbps}$$

Notice that the number of bytes per MUX data Frame (MDF) in the above equations is given by $$K_p = \sum_i B_{p,j}$$

and the RS codeword length is given by $$N_{FEC,p} = M_p \times K_p + R_p.$$

Table 1 lists some possible values of $N_{BC,p}$ and $T_p$ for a latency path whose overhead channel carries only CRC and path-related Indicator Bits.

TABLE 1

Examples for the choice of $T_p$ for varying numbers of frame bearers on a latency path whose overhead channel carries only CRC and path-related Indicator Bits

| Frame bearers per latency path, $N_{BC,p}$ | $T_p$ | Definition of overhead bytes when the overhead channel carries only CRC and path-related Indicator Bits |
|---|---|---|
| 1 | 34 | The first overhead byte carries the CRC; the second overhead byte carries the Indicator Bits; the third overhead byte carries again the CRC, and so on. An overhead byte is inserted once every $T_p$ = 34 MUX Data Frames. Thus, there is one CRC overhead byte every 68 MUX Data Frames. |
| 2 | 68 | The first overhead byte carries the CRC and the second overhead byte carries the Indicator Bits. The two overhead bytes are inserted once every $T_p$ = 68 MUX Data Frames. |
| 3 | 68 | The first overhead byte carries CRC, the second overhead byte carries the Indicator Bits and the third overhead byte is reserved for future use. The three overhead bytes are inserted once ever $T_p$ = 68 MUX Data Frames |

Figure 3:
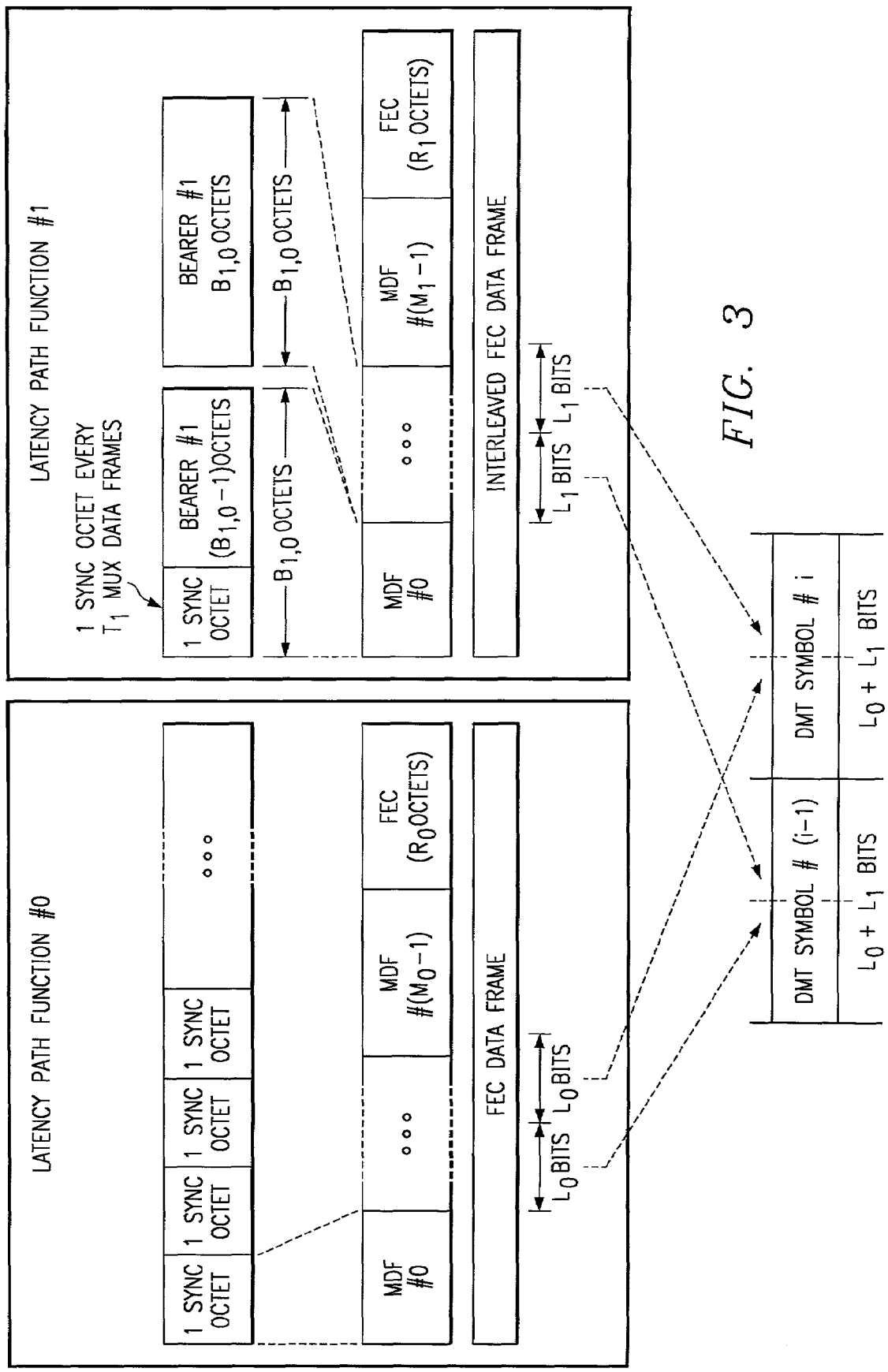
FIG. 3 illustrates framing of the overhead channel (in dual latency mode), where one latency path carries only an overhead channel but not frame bearers.

As a special case of the proposed framing scheme, an overhead channel could be placed in a latency path (e.g. in a non-interleaved latency path) by itself without any frame bearers. This case is shown in FIG. 3. When the number of frame bearers, $N_{BC,p}$, is equal to zero on a latency path p, then only meaningful setting for the parameter $T_p$ on that same latency path is: $T_p=1$. This is true whether or not one decides to RS-encode this particular latency path. In addition, the MUX Data Frame degenerates to consisting of only one overhead byte (Sync byte).

Two examples for choosing the framing parameters are described below in paragraphs 0024–0038.

The first example is the case where an Asynchronous Transfer Mode (ATM) or data channel is attached to an application that requests a data rate of 1 Mbps. It is assumed for the example that the system is in multiple latency mode and the bearer channel requesting 1 Mbps is assigned to a latency path which does not carry message based overhead data (e.g. AOC/EOC bytes). In that case, this particular latency path will only carry the path-related CRC and Indicator Bits according to current framing proposals.

Setting the Net Data Rate to 1 Mbps, we will solve for parameters $K_p$, $M_p$, $T_p$, $R_p$, and $L_p$:

$$\text{Net Data Rate} =$$

$$\frac{(K_p - N_{BC,p}/T_p) \times M_p \times L_p}{K_p \times M_p + R_p} \times 4 \text{ kbps} = 250 \times 4 \text{ kbps} = 1 \text{ Mbps}$$

Since the calculation of the parameter values becomes easier by starting with the Aggregate Data Rate (defined as: Net Data Rate+Frame Overhead Rate), we take:

$$\text{Aggregate Date Rate} = \frac{K_p \times M_p \times L_p}{K_p \times M_p + R_p} \times 4 \text{ kbps} \geq 250 \times 4 \text{ kbps}$$

Next we choose the number of Reed-Solomon (RS) check bytes to ensure a desired bit error rate (BER) and the RS codeword length according to latency requirements. Here we let $R_p=16$ and $N_p=255$ (i.e. $K_p \times M_p=239$). We then get:

$$\text{Aggregate Data Rate} = \frac{239 \times L_p}{255} \times 4 \text{ kbps} \geq 250 \times 4 \text{ kbps}$$

resulting in the requirement: $L_p \geq 266.73$. Since $L_p$ must be an integer, we choose $L_p=267$.

The Frame Overhead Rate can now be computed. Since there is only one frame bearer in the latency path, we have $N_{BC}=1$. With $K_p \times M_p=239$, we choose $M_p=1$. Since only one CRC byte and one byte carrying Indicator Bits need to be inserted once every 68 MUX Data Frames, we choose $T_p=34$ (see Table 1). Finally, we obtain:

$$\text{Frame Overhead Rate} = \frac{N_{BC,p}}{T_p} \times \frac{M_p \times L_p}{K_p \times M_p + R_p} \times 4 \text{ kbps}$$

$$= \frac{1}{34} \times \frac{1 \times 267}{255} \times 4 \text{ kbps} = 0.123 \text{ kbps}$$

Note that this very low overhead rate is acceptable because the AOC/EOC data is carried on another latency path. The total bandwidth for overhead is significantly greater than 123 bps.

With the above choice of values for all parameters we finally have to verify the resulting Net Data Rate:

$$\text{Net Data Rate} = \frac{(K_p - N_{BC,p}/T_p) \times M_p \times L_p}{K_p \times M_p + R_p} \times 4 \text{ kbps} =$$

$$= \frac{(239 - 1/34) \times 1 \times 267}{255} \times 4 \text{ kbps} = 250.22 \times 4 \text{ kbps} =$$

$$= 1.0009 \text{ Mbps}$$

Note that there is no reason why the available Net Data Rate would have to be an integer multiple of 4 kbps. If the available Net Data Rate is higher than the requested data rate for an ATM or data channel, then the frame bearer will compensate this excess bandwidth with the occasional transmission of an Idle Cell or Idle Byte. (The case of exact matching for a voice channel is treated in the next example). Similarly, there is no reason why the Frame Overhead Rate must be an integer multiple of 4 kbps. Rather, the Total Data Rate which is defined as the sum of Net Data Rate plus Frame Overhead Rate plus RS-Coding Overhead Rate is an integer multiple of 4 kbps since $L_p$ is an integer.

If there were a requirement that both Net Data Rate and Frame Overhead Rate have to be an integer multiple of 4 kbps, then also the Aggregate Data Rate (=Net Data Rate+ Frame Overhead Rate) would have to be an integer multiple of 4 kbps. Looking at the relation for the Aggregate Data Rate, $$\text{Aggregate Data Rate} = \frac{K_p \times M_p \times L_p}{K_p \times M_p \times R_p} \times 4 \text{ kbps}$$

it is easy to see that this requirement would pose strict constraints on the choice of $K_p$, $M_p$, $L_p$, $R_p$, which would result in either increased RS-coding overhead or frame overhead or both. Specifically, $(K_p \times M_p + R_p)$ would have to divide $(K_p \times M_p \times L_p)$. Note that this undesirable constraint would be independent of the choice of $T_p$.

Figure 4:
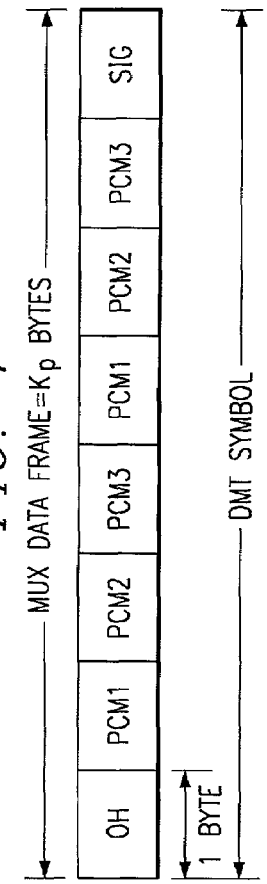
FIG. 4 illustrates the structure of MUX Data Frame for transmission of PCM voice channels.

As a second example, we consider Channelized Voice over DSL (CVoDSL) and the case where one or more PCM voice channels are carried in one latency path. According to an ITU proposal, two bytes per PCM channel and one byte for voice signaling are transmitted every 250 μs. As a result, the data rate for voice signaling is equal to 32 kbps. A suitable MUX Data Frame then has the structure of FIG. 4 (assuming 3 PCM voice channels). Tn FIG. 4, "OH" denotes the Frame Overhead Byte (Sync Byte) and "SIG" denotes a Byte for voice signaling. Since the total bandwidth for the PCM voice streams is required to be an integer multiple of 64 kbps, this adds a constraint to the mechanism of stealing bearer bytes for frame overhead insertion. By setting Tp=1, every MUX Data Frame has the same structure shown in FIG. 4.

Since the latency path carrying PCM voice channels is typically not RS-encoded, set $R_p$=0. Without loss of generality, it is assumed for our example that no data is carried together with voice on that latency path. We then obtain the following parameter settings:

$K_p$=1+2×(Number of PCM voice channels)+1=2×(1+ Number of PCM voice channels), and $L_p$=$K_p$×8

Note that for $R_p$=0, the definition of $M_p$ (=number of MUX data Frames per FEC Data Frame) and $S_p$ (=number of DMT symbols per FEC Data Frame) degenerates. For $R_p$=0, the term "MUX Data Frame" is substituted for the term "FEC Data Frame" and consequently arrive at the parameter settings:

$M_p$=1, and $S_p$=1.

Lossless CVoDSL Dynamic Rate Repartitioning (DRR) transitions require alignment between MUX Data Frames and DMT symbols. $S_p$=1 provides the maximum opportunity for DRR transitions to occur (i.e. at every DMT symbol boundary). The resulting data rates on this latency path then become:

Frame Overhead Rate=32 kbps

Net Data Rate=($K_p$−1)×32 kbps where 32 kbps of the Net Data Rate are used for voice signaling Aggregate Data Rate=$K_p$×32 kbps.

Note that since voice signaling is carried within the frame bearer, the data rate of 32 kbps for voice signaling is included in the Net Data Rate. The above example also shows that the Frame Overhead Rate is constant at 32 kbps on the latency path carrying CVoDSL. Therefore, we propose that the message based overhead data (e.g. AOC/EOC) is carried in the overhead channel of this latency path if the ADSL modem operates in multiple latency mode. (In single latency mode, there is obviously no ambiguity about which latency path carries the message based overhead data).

The frame format proposed does not limit the sharing of the overhead channel bandwidth with the voice signaling bandwidth in CVoDSL applications. For example, with CVoDSL signaling as the first byte in the MUX Data Frame and $T_p$=68, the first byte per MUX Data Frame can be shared by putting a "normal" overhead byte every 68 frames and a voice signaling byte in all other frames. This sharing results in no impact on any other bytes in the MUX Data Frame (i.e. those carrying PCM voice samples).

While this invention has been described with reference to illustrative embodiments, this description is not intended to be construed in a limiting sense. Various modifications and combinations of the illustrative embodiments, as well as other embodiments of this invention, will be apparent to persons skilled in the art upon reference to the description. It is therefore intended that the appended claims encompass any such modifications or embodiments.

The invention claimed is:

1. A method of framing an overhead channel in an ADSL Modem comprising:
   inserting one or more frame overhead bytes every $T_p$ MUX Data Frames, where $T_p$ is a selectable parameter and index p indicates a latency path of a plurality of latency paths, wherein frame overhead rate is independent of payload data rate, the inserting the one or more frame overhead bytes further comprising:
   inserting one or more first frame overhead bytes every $T_p$=$T_0$ MUX Data Frames for a first latency path $p_0$; and
   inserting one or more second frame overhead bytes every $T_p$=$T_1$ MUX Data Frames for a second latency path $p_1$.

2. The method of claim 1, wherein:
   the first latency path is configured to carry bit-oriented and message-based overhead structure; and
   the second latency path is configured to carry CRC and path related Indicator bits in its overhead channel.

3. The method of claim 2 wherein said one or more overhead bytes replaces a data byte every $T_p$ MUX Data Frames.

4. The method of claim 2 wherein said overhead channel is placed on a latency path by itself without any frame bearers and $T_p=1$.

5. The method of claim 2 wherein $T_0=1$ for a first latency path carrying bit-oriented and message-based overhead structure and $T_1=34$ for the second latency path which carries CRC and path related Indicator bits in its overhead channel.

6. The method of claim 2 wherein there are more than one frame bearer per latency path.

7. The method of claim 6 wherein the number of bytes in each MUX Data Frame is kept constant by taking one byte from each frame bearer once every $T_p$ MUX Data frames.

8. The method of claim 2 wherein said MUX Data Frame includes PCM voice channels, an overhead byte and a byte for voice signaling.

9. The method of claim 2 wherein said overhead byte bandwidth is shared with other applications.

10. A method according to claim 1, wherein the payload data rate is net data rate.

11. A method of framing an overhead channel in an ADSL system comprising:
providing a data channel at a given payload data rate; and
providing an overhead channel at a rate independent of the payload data rate; and
inserting one or more frame overhead bytes every $T_p$ MUX Data Frames, where $T_p$ is a selectable parameter and index p indicates a latency path of a plurality of latency paths, wherein frame overhead rate is independent of payload data rate, the inserting the one or more frame overhead bytes further comprising:
inserting one or more first frame overhead bytes every $T_p=T_0$ MUX Data Frames for a first latency path $p_0$; and
inserting one or more second frame overhead bytes every $T_p=T_1$ MUX Data Frames for a second latency path $p_1$.

12. A communication device configured to
provide a data channel at a given payload data rate; and
provide an overhead channel at a rate independent of the payload data rate rate; and
insert one or more frame overhead bytes every $T_p$ MUX Data Frames, where $T_p$ is a selectable parameter and index p indicates a latency path of a plurality of latency paths, wherein frame overhead rate is independent of payload data rate, the inserting the one or more frame overhead bytes further comprising:
inserting one or more first frame overhead bytes every $T_p=T_0$ MUX Data Frames for a first latency path $p_O$; and
inserting one or more second frame overhead bytes every $T_p=T_1$ MUX Data Frames for a second latency path $p_1$.

13. A communication device according to claim 12, further configured to:
configure the first latency path to carry bit-oriented and message-based overhead structure; and
configure the second latency path to carry CRC and path related Indicator bits in its overhead channel.

14. A communication device according to claim 12, further configured to:
replace a data byte every $T_p$ MUX Data Frames with one or more overhead bytes.

15. A communication device according to claim 12, wherein said overhead channel is placed on a latency path by itself without any frame bearers and $T_p=1$.

16. A communication device according to claim 12, wherein there are multiple independently configured latency paths and $T_0=1$ for a first latency path carrying bi-oriented and message-based overhead structure and $T_i=34$ for a second latency path which carries CRC and path related Indicator bits in its overhead channel.

17. A communication device according to claim 12, wherein there are more than one frame bearer per latency path and the communication device is further configured to:
keep the number of bytes in each MUX Data Frame constant by taking one byte from each frame bearer once every $T_p$ MUX Data frames.

18. A communication device according to claim 12, wherein said MUX Data Frame includes PCM voice channels, an overhead byte and a byte for voice signaling.

* * * * *